June 10, 1958
C. L. HAMM
2,838,348
HIGH SPEED ANTI-FRICTION BEARINGS
Filed April 17, 1956
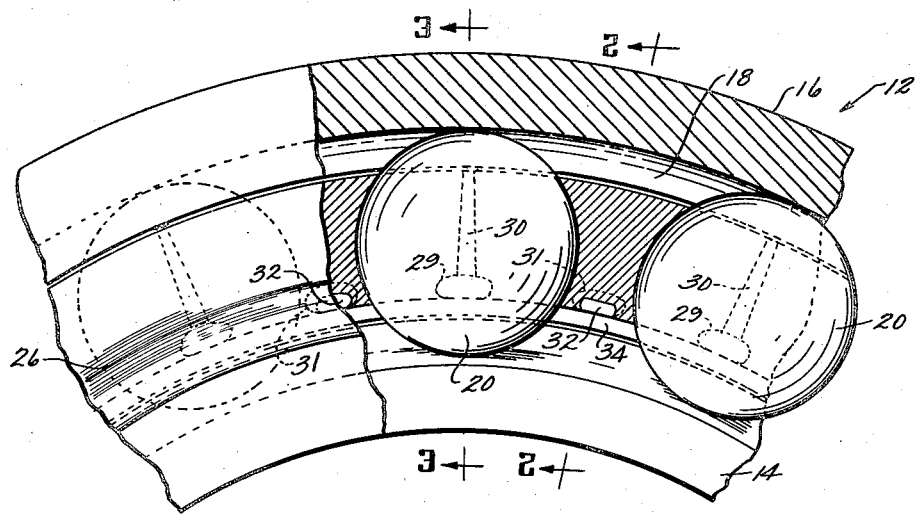
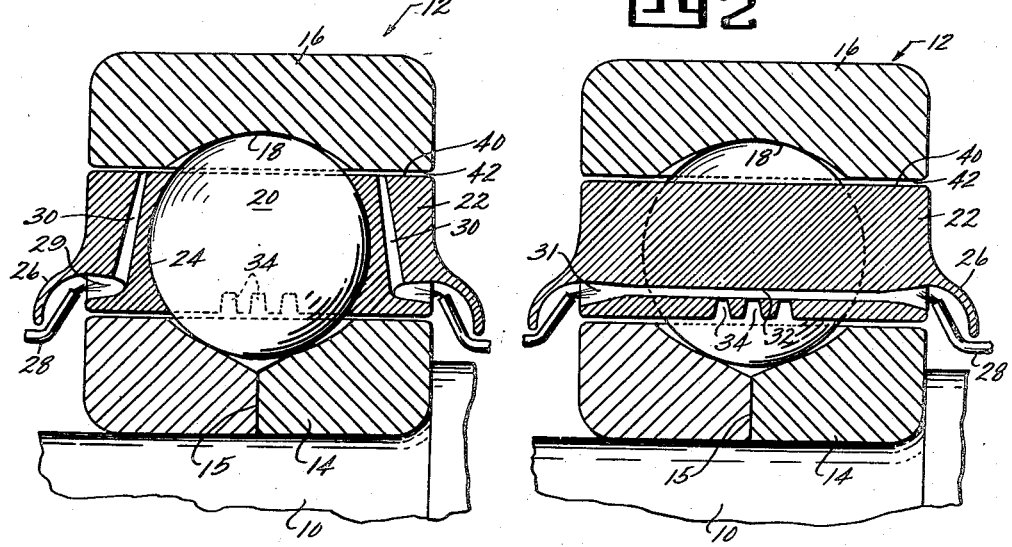
INVENTOR.
CLARENCE L. HAMM
BY
Maurice H. Klitzman
HIS ATTORNEY—

United States Patent Office 2,838,348
Patented June 10, 1958

2,838,348

HIGH SPEED ANTI-FRICTION BEARINGS

Clarence Lockwood Hamm, Marblehead, Mass., assignor to General Electric Company, a corporation of New York Application April 17, 1956, Serial No. 578,749

5 Claims. (Cl. 308—187)

This invention relates to a high speed anti-friction bearing and in particular to a means for lubricating critical wearing portions of a high speed bearing.

In an anti-friction bearing, the bearing is usually mounted on a shaft. The bearing generally comprises an inner ring and an outer ring with such members as balls or rollers positioned between them. The balls or rollers are generally held in spaced relationship by a cage, or separator or retainer. As the shaft rotates, the inner ring rotates with respect to the outer ring, with the cage and rollers or balls positioned between the rings also rotating. As the speed of the shaft increases, the friction generated by the relative motions of the cage and balls or rollers with respect to the rings increases. The thickness of the cage or separator is increased in size to withstand the loads at the higher speeds. The size of the cage has been such that it substantially fills the space between the inner and outer rings. Only a small opening remains through which lubricating oils can be forced into the bearings to lubricate the metal to metal surface contact of the parts. This opening is so small that at high speeds the oil jets directed at the opening must be accurately held in place, or the oil will not find its way into the opening. Even though the oil jet may be accurately positioned, it has also been found that the oil splashes outwardly from the opening. Excessive bearing windage and maneuvering forces tend to deflect the oil away from the bearing. This not only creates improper lubrication of the roller or ball bearing, but also is a loss of essentially needed lubricating oil. This is particularly true in high speed bearings in aircraft applications where the speed of the bearing is greater than the speed of the oil jet. This improper lubrication condition often results in failure of the bearing.

Another problem that has been created is that the separator cage of the bearing rides on the inner ring. Now, due to centrifugal forces, it is more difficult to lubricate the inner ring than the outer ring. Excessive friction is created at high speeds, for example, over a million $dN$ where $d$ is the bore in millimeters and N is R. P. M. Generally, failure occurs at the cage adjacent the inner ring. Prior art devices have attempted to lubricate the balls, as well as rollers, in bearings and have attempted to lubricate the cages. However, it has been found that at the high speed operation, these prior art attempts have not recognized the real problem involved, and, accordingly, the types of structures that have been proposed are not adapted for use at high speed operation. The prior art devices do not disclose methods for distributing and retaining oil at the inner ring of a bearing operating at high speed. Also, no attempt has been made to decrease the accuracy requirement in maintaining the critical location of the oil jet nozzle with respect to the opening in the bearing. The large vibrations encountered at the high speed conditions can very easily throw the nozzle out of alignment with the opening at which the oil jet has been directed. To add to this condition, the cage usually slides rather than rolls on the inner ring, and the balls or rollers slide in their arcuate pockets in the cage. Therefore, a great deal of friction and heat is generated in the cage, especially at high speeds. The large centrifugal force throws the oil in the bearing outwardly to the outer ring and the outer portion of the cage, leaving the inner ring and the inner portions of the cage substantially without lubrication oils. These inadequate lubricating conditions, together with the inability to maintain oil jet accuracy created by the prior are devices, often result in premature failure of the cage, and accordingly, failure of the bearing itself.

Therefore, it is a general object of this invention to provide a lubrication system for a high speed bearing that is capable of directing adequate quantities of lubricating oil to the critical locations of the cage of a high speed roller or ball bearing.

It is another object of this invention to provide a nozzle for directing a jet of lubricating oil into a high speed ball or roller bearing, which bearing is constructed in such a manner that the critical location of the jet played upon the bearing is substantially eliminated.

It is still another object of this invention to provide a cage for a high speed roller bearing in which the cage is constructed in such a manner as to ride upon the outer ring of the bearing, where it is more feasible to lubricate, rather than on the inner ring which is difficult to lubricate.

A still further object of this invention is to provide a high speed ball or roller bearing in combination with a nozzle for playing a jet of lubricating oil on the outside of the cage of the bearing, the cage having a shroud means for receiving and placing the oil under centrifugal forces for distributing the oil through passageways to a number of locations inside of the cage, in order that the lubricating oil be deposited in reservoirs and on sliding contacting surfaces for proper lubrication of the critical portions of the high speed bearing.

It is still another object of this invention to provide a means for distributing lubricating oil to each ball pocket and any number of critical points within a high speed bearing in such a manner as to obtain the features of multiple oil jet lubrication with a single jet, thereby eliminating the disadvantages of multiple jets.

These and other objects will become more apparent when read in the light of the accompanying drawing wherein like parts are designated by the same numbers and wherein the parts are referred to specifically but are intended to be applied as generically as the prior art will permit, and wherein:

Figure 1 is a view of a ball bearing partially in broken section;

Figure 2 is a cross-sectional view of the bearing taken on lines 2—2 of Figure 1; and Figure 3 is a cross-sectional view of the bearing taken on lines 3—3 of Figure 1.

Briefly stated, and in accordance with one aspect of this invention, a high speed ball bearing is provided in which the cage rides on the outer ring of the bearing and the cage has a shroud defining a supply reservoir. Axial passageways are provided for receiving lubricating oil from the supply reservoir and for directing it to arcuate ball pockets. Radial passageways are connected to the supply reservoir to direct the lubricating oil outwardly under centrifugal forces to the outer ring. Also, the axial passageways have elongated funnel-shaped openings to more readily receive oil from the supply reservoir. Annular grooves are formed on the inner diameter of the cage so as to form reservoirs for the oil thereby providing a means for retaining the oil on the inner portion or inner diameter of the cage.

Referring to the drawing, the numeral 10 generally designates a shaft upon which is mounted a ball bearing generally referred to at 12. The ball bearing 12 is press fit or the like on the shaft so that an inner ring 14 rotates with the shaft 10. It is noted that the inner ring is split in halves as shown at 15 to provide for assembly of the bearing. Generally, the inner ring 14 and shaft 10 rotate within an outer ring 16. In order to provide for substantially frictionless movement between the inner ring and outer ring, ball races 18 are provided in each of the inner ring and outer ring with balls 20 being positioned in the ball races. A separator, retainer or cage 22 maintains the balls 20 in spaced relationship within the ball race 18 so as to properly distribute the load on the balls and to prevent contact between the balls. Generally, the separator or cage 22 is made in one piece. However, the cage can be made in halves when using a solid rather than split inner ring 14. The cage 22 is provided with arcuate ball pockets 24 which are shaped to conform to each of the balls 20.

The above description has been directed to a conventional type of ball bearing well known in the art. Lubricating oil would not normally find its way into the bearing and would be lost due to centrifugal forces occurring at the high speeds. However, in order not to lose the oil, and to direct it to the more critical areas within the bearing, the cage 22 is formed with an annular shroud 26 of arcuate shape. The shroud 26 has been shown on both sides of the bearing, but it is recognized that the need for both may not be necessary in some applications, and accordingly, it is intended that this invention be used on one or both sides of the bearing. The shroud is positioned in such a manner as to receive lubricating oil from a jet nozzle 28. The oil is thrown outwardly under centrifugal force into the shroud and it forms sufficient pressure to work its way into one set of axial openings which terminate into radial passageways 30. Another set of axial passageways is provided at 32 for receiving the lubricating oil from under the shroud. Since the oil is under sufficient pressure, due to the centrifugal forces created by the high speed rotation of the bearing, it will force the oil into the annular grooves 34, which intersect the axial passageways 32. One or more grooves 34 can be used depending upon the requirements for the conditions under which the bearing is intended for use. Also, the axial passageways 32 not only supply lubricating oil to the grooves 34, but in addition, they supply lubricating oil directly to the balls 20 and arcuate ball pockets 24. It is noted that the axial openings 29 and 31 are funnel-shaped so as to provide a larger area for the incoming lubricating oil. This provides a means for taking more oil on board the bearing.

The cage 22 is so designated as to have an outer riding cage surface 40 riding on the inner surface 42 of the outer ring 16. Therefore, large frictional forces will generally be generated at this location since there is relative sliding movement taking place. In order to keep these frictional forces to a minimum, lubricating oil from the radial passageways 30 is directed to these metal to metal contacting surfaces since the high speed of the bearing will generate sufficient centrifugal force to throw the oil outwardly.

Lubricating oil is supplied to the nozzle 28 by any well known pumping means from a source of oil (not shown). During high speed operation, the oil jet emanating from the nozzle 28 is held in position so as to be in alignment with the funnel-shaped openings 29 and 31. By providing funnel shaped openings 29 and 31 as shown in Figure 1, more oil will find its way into these openings as compared to normal openings. It is noted that the size of the openings in the side of the cage 22 is limited since it must carry large loads. Therefore, by funneling a portion of the opening at 29 and 31, such as shown, the strength of the cage is not materially decreased. Due to the centrifugal force on the oil, the oil will enter the axial opening 29 and radial passageway 30 and spread about the outer riding cage surface 40. This is an area where the cage 22 has relative sliding movement with respect to the inner surface 42 of the outer ring 16 thereby creating friction. Such friction will be materially decreased by the directing of the lubricating oil to these critical locations.

Also, as shown in Figure 2, the oil enters funnel-shaped opening 31 from under the shroud 26. The oil then passes through the axial passageway 32 to grooves 34. The grooves 34 form reservoirs for housing the lubricating oil. As the balls 20 rotate they will have a film of oil deposited on them as they pass through a film of lubricating oil at the grooves. In this way, oil will be directed to the balls in the most efficient manner. Also, the shroud 26 prevents the oil from splashing outwardly due to centrifugal force, so that most of it will find its way into the openings 29 and 31 and thence into their respective passageways 30 and 32.

As a result of this construction, the cage is lubricated at all of its critical locations simultaneously. Since the cage is the most critical part of the bearing, it imposes a limitation on the speed of the bearing. However, this manner of lubrication will extend the life of the bearing as a whole, and allow higher speeds heretofore proven to be impractical.

Also, a multiple jet lubrication effect is obtained by this construction with only a single jet of oil. In addition between control of the supply of lubricating oil to the critical locations can be had by increasing or decreasing the number of passageways and grooves.

While a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim as new and desire to secure by Letters Patent of the United States is:

1. A high speed bearing comprising an inner ring and an outer ring, a bearing cage positioned between the rings having members therein, at least one annular shroud on the cage forming a reservoir for oil, the reservoir being adapted to receive oil from a source of lubricating oil, an axial passageway in said cage connected to the reservoir, at least one annular groove on the inner surface of the cage intersecting the axial passageway so as to receive oil from the reservoir.

2. A high speed bearing comprising an inner ring and an outer ring, a bearing positioned between the rings having members therein, at least one annular shroud on the cage forming a reservoir for oil, the reservoir being adapted to receive oil from a source of lubricating oil, an axial passageway in said cage connected to the reservoir, at least one annular groove on the inner surface of the cage intersecting the axial passageway so as to receive oil from the reservoir, and radial passageways in said cage extending from the reservoir to the outer surface of the cage.

3. A high speed bearing comprising an inner ring and an outer ring, a bearing cage positioned between the rings having members therein, at least one annular shroud on the cage forming a reservoir for oil, the reservoir being adapted to receive oil from a source of lubricating oil, an axial passageway in said cage connected to the reservoir, at least one annular groove on the inner surface of the cage intersecting the axial passageway so as to receive oil from the reservoir, and radial passageways in said cage extending from the reservoir to the outer surface of the cage, the annular shroud extending from the side of the cage in an axial direction and then downwardly in a transverse direction so that during high speeds the centrifugal forces will tend to urge the oil in the passageways rather than away from the passageways.

4. A high speed bearing comprising an inner ring and an outer ring, a bearing cage positioned between the rings having members therein, at least one annular shroud on the cage forming a reservoir for oil, the reservoir being adapted to receive oil from a source of lubricating oil, an axial passageway in said cage connected to the reservoir, at least one annular groove on the inner surface of the cage intersecting the axial passageway so as to receive oil from the reservoir, and radial passageways in said cage extending from the reservoir to the outer surface of the cage, the passageways in the bearing cage being funnel-shaped at the reservoir so as to take more lubricating oil on board.

5. A high speed bearing comprising an inner ring and an outer ring, a bearing cage riding on the inner surface of the outer ring, a series of arcuate pockets in the cage, members positioned in the pockets and between the outer and inner rings, the cage having an axial extension, a plurality of radial passageways in said cage extending from beneath the axial extension to the outer surface of the cage, and a plurality of axial passageways in said cage extending from beneath the axially positioned extension, and means on the inner diameter of the cage intersecting the axial passageway and forming a reservoir for lubricating oil.

References Cited in the file of this patent

UNITED STATES PATENTS 2,280,659    Muller _____ Apr. 21, 1942

FOREIGN PATENTS 575,369    Great Britain _____ Feb. 14, 1946
592,947    Great Britain _____ Oct. 3, 1947

UNITED STATES PATENT OFFICE

CERTIFICATE OF CORRECTION

Patent No. 2,838,348                                                            June 10, 1958

Clarence Lockwood Hamm

It is hereby certified that error appears in the printed specification of the above numbered patent requiring correction and that the said Letters Patent should read as corrected below.

Column 2, line 11, for "are" read -- art --; column 4, line 51, after "bearing" insert -- cage --.

Signed and sealed this 12th day of August 1958.

(SEAL)
Attest:
KARL H. AXLINE

Attesting Officer

ROBERT C. WATSON
Commissioner of Patents